United States Patent [19]

Matsumoto et al.

[11] Patent Number: 4,614,114
[45] Date of Patent: Sep. 30, 1986

[54] MEASURING DEVICE

[75] Inventors: Katsutake Matsumoto; Yoichi Yachida, both of Nagaoka, Japan

[73] Assignee: Nippon Seiki Co., Ltd., Niigata, Japan

[21] Appl. No.: 580,200

[22] Filed: Feb. 15, 1984

[30] Foreign Application Priority Data

Mar. 31, 1983 [JP] Japan .................................. 58-57010

[51] Int. Cl.$^4$ ............................................ G01F 23/36
[52] U.S. Cl. ...................................................... 73/313
[58] Field of Search ................... 73/313, 301, 723, 1 H, 73/432, 430

[56] References Cited

U.S. PATENT DOCUMENTS 3,614,887 10/1971 Douglass .............................. 73/1 H Primary Examiner—David Simmons
Attorney, Agent, or Firm—Flehr, Hohbach, Test, Albritton & Herbert

[57] ABSTRACT

A measuring device comprises not only a fluctuation-suppressing means between the input and output circuits for absorbing sudden variations in input signal but also a selection control means which can, if so desired, invalidate the fluctuation-suppressing function by the open-close operation on a switch outside the circuits so that the input signal can be transmitted directly to the output side. This reduces the time required for inspection and diagnostic testing and, if the processing functions used in common are incorporated internally, the same circuits can be used both for measurements requiring the fluctuation-suppressing function and for those not requiring it.

4 Claims, 5 Drawing Figures

MEASURING DEVICE

BACKGROUND OF THE INVENTION

This invention relates generally to a device which enters changes in a measured quantity as changes in an electric signal and uses a displayer to give a warning at a specified value or to display the measured value. It relates in particular to a measuring device which provides a fluctuation-suppressing means between the input and output circuits to suppress the fluctuations in its display caused by irregular variations in the measured quantity.

A fuel gauge for a vehicle equipped with a delay circuit for suppressing fluctuations, for example, may be considered as an analog device or a digital device.

Firstly, there is shown in FIG. 1 a mechanism for making an analog display of the remaining amount of fuel. The resistance of a rheostat 1 is caused to change according to the variations in the vertical position of the liquid surface and it is used to detect the liquid level as a variation in the terminal voltage. This is entered into a driving circuit 3 through a delay circuit 2 consisting of a resistor and a capacitor so that an ammeter 4 is activated as an indicator for an analog display of the amount of remaining fuel.

In this application, vibrations of the vehicle will cause big changes in the liquid surface and the terminal voltage of the rheostat unit 1 will correspondingly undergo unstable variations but such abrupt changes are absorbed by the delay circuit 2 so that a relatively stable display can be obtained by the ammeter 4.

FIG. 2 shows, on the other hand, an example of measuring and displaying the remaining amount of fuel by a digital processing. In this example, the output voltage which corresponds to the liquid level and is detected by the rheostat unit 5 is converted into a digital signal through an A-D conversion circuit 6 and is transmitted as a display signal to a digital displayer 8 by a decoder driver 7. Since it is indispensable also in this situation that liquid surface variations be absorbed, a delay circuit as shown in FIG. 1 may be connected to the output side of the voltage terminal of the rheostat unit 5, but a delay circuit 9 for absorbing the variations of digital quantity is provided at the back side of the A-D conversion circuit 6 in the case of such a digital processing. Such variation-absorbing function of digital processing is particularly useful for calculation display by a microcomputer because it is customary and structurally advantageous to incorporate the delay circuit 9 inside the system.

If it is desired to detect the lowering fuel level and to activate an alarm at a predetermined point, a judgment circuit may be installed for comparing the standard voltage corresponding to the alarm-activating point and the input voltage (the digital signal corresponding to the alarm-activating point and that corresponding to the input voltage after the A-D conversion) so that the alarm will be activated by this judgment signal. In this situation, too, since the variations in the liquid surface at the alarm-activating point give rise to chattering in the judgment signal, it is necessary to prevent the unstable behavior of the alarm by means of a delay function as described above for the case of ordinary displays.

Since these delay functions for absorbing variations operate unconditionally in response to input signals, however, they are disadvantageous when used, for example, for checking the input/output characteristics for the inspection of such display devices at the time of delivery from factory or for their diagnostic testing because the output will not easily reach the value corresponding to the input due to the delay function even if the input is changed to one of a certain number of typical values (inclusive of the alarm-activating level). This makes inspections and diagnostic testing very time-consuming.

If, as in the case of a microcomputer, all processing functions except for the input and output circuits are incorporated into one IC, it is desirable from the point of view of cost to incorporate internally the processing functions which are used in common so that the device can be made usable with a large variety of measuring instruments merely by replacing the input and output circuits. If the aforementioned delay function is incorporated, however, there arises the problem that the same IC can no longer be used for the measurement not requiring a delaying process such as the detection of the voltage of a battery and that dedicated ICs incorporating individual processing functions must be provided.

SUMMARY OF THE INVENTION

The present invention has been completed in view of the aforementioned problems. It is therefore an object of the present invention to provide a general-purpose measuring device which not only has between its input and output circuits a fluctuation-supporessing means for absorbing sudden variations in input signals but also has a selection control means for invalidating the aforementioned fluctuation-suppressing function, if desired, to transmit input signals directly into the output side so that the work efficiency can be improved by reducing the time required for inspection or diagnostic testing and, if processing functions to be used in common are incorporated internally, that the same circuit can be utilized both where the fluctuation-suppressing function is necessary and where it is not required. The above and other objects of the present invention will become clearer from the following description with reference to the drawings in which like reference numerals designate like parts.

DETAILED DESCRIPTION OF PREFERRED EMBODIMENTS

Figure 1:
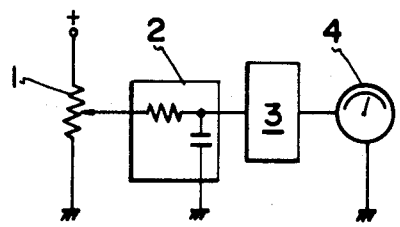
FIG. 1 is a block circuit diagram showing a conventional measuring device having a delay circuit.
Figure 2:
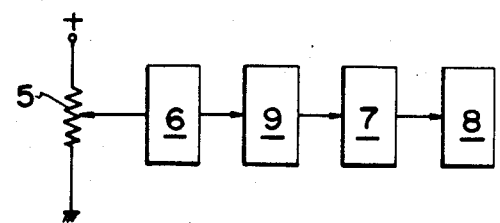
FIG. 2 is a block circuit diagram showing a conventional measuring device having a delay function by digital processing.
Figure 3:
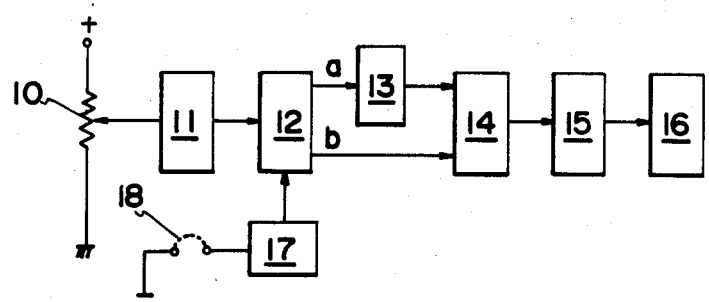
FIG. 3 is a block circuit diagram representing a measuring device according to the present invention.

There is shown in FIG. 3 a measuring device of the present invention used as fuel gauge of a vehicle wherein an output voltage corresponding to the liquid level detected by the rheostat unit 10 is converted by the A-D conversion circuit 11 into liquid level data in the form of a digital signal and is entered into the distribution circuit 12. The liquid level data from the A-D conversion circuit 11 are selectively distributed by the distribution circuit 12 between the output terminal a to the delay circuit 13 which is a kind of fluctuation-suppressing means and the output terminal b to the OR gate 14, and either the liquid level data on which fluctuation-suppressing process has been performed or those on which this process has not been performed are transmitted to the decoder driver 15. The displayer 16, together with proper selection of decoder driver 15, can make a display according to the liquid level data in the form either of a bar graph or of a digital display. The selective output of the liquid level data by the aforementioned distribution circuit 12 is controlled by a selection control circuit 17. The selection control circuit 17 controls the distribution circuit 12 by detecting whether the switch 18 outside is open or closed and transmits the liquid level data to either the output terminal a or b. The liquid level data will be transmitted to the output terminal a on the side of the delay circuit 13 if the switch 18 is open and to the output terminal b directly connected to the OR gate 14 if the switch 18 is closed.

Under the normal conditions of use, the switch 18 is open so that the liquid level data obtained by the rheostat unit 10 and the A-D conversion circuit 11 are transmitted to the output terminal a on the side of the delay circuit 13 and displayed by the displayer 16 through the OR gate 14 and the decoder drive 15. Since the delay circuit 13 functions effectively in this situation, sudden changes in the liquid surface caused by an external disturbance are delayed timewise and are not directly transmitted to the displayer 16. As a result, variations become absorbed and hence a stable display without fluctuations can be obtained.

The switch 18 is closed when it is desired to examine the changes in the resistance of the rheostat unit 10 corresponding to the liquid level as well as the display characteristics of the displayer 16. This causes the selection control circuit 17 to control the distribution circuit 12 so that the liquid level data are transmitted to the output terminal b which is directly connected to the OR gate 14. Since this invalidates the fluctuation-suppressing function of the delay circuit 13 and immediately causes the liquid level data to be displayed by the displayer 16, the time required for inspection can be reduced significantly and the work efficiency can be greatly improved especially if there are many units to be processed.

Figure 4:
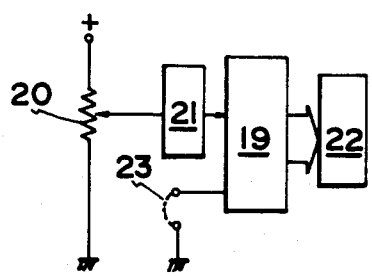
FIG. 4 is a block diagram of a measuring device of the present invention comprising a microcomputer.

FIG. 4 shows the selection control when a measuring device of the aforementioned type is operated by a microcomputer.

Figure 5:
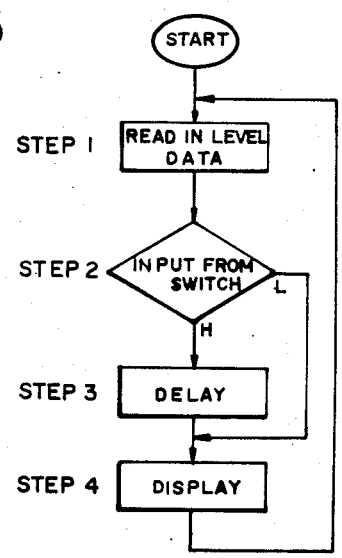
FIG. 5 is a flow chart representing the process performed by the measuring devices of FIGS. 4 and 5.

The microcomputer 19 detects and displays the liquid level data according to the flow diagram of FIG. 5. The liquid level data obtained by a rheostat unit 20 and converted by an A-D conversion circuit 21 are entered through the data input port and the displayer 22 displays the detected liquid level as a bar graph, for example, on the basis of these data.

A switch 23 is connected to a designated input port of the microcomputer 19 and its input condition (that is, whether this port is grounded or it is open) determines whether the fluctuation-suppressing function should be exercised on the liquid level data stored inside.

If the switch 23 is open, the result of Step 2 will be H and the next operation will be Step 3 whereby a fluctuation-suppressing process is carried out. In other words, since the fluctuation-suppressing routine is operated under the normal conditions of use, sudden changes in the liquid level caused by the surface variations are absorbed and a stable display without fluctuations can be obtained by the displayer 22.

In the case of a pre-delivery inspection or diagnostic testing, for example, the switch 23 might be closed. The result of Step 2, then, will be L and the system will directly proceed to Step 4 whereby a display is made immediately. This means that Step 3 for performing the fluctuation-suppressing process is bypassed. Since the liquid level data are immediately displayed by the displayer 22, inspection can be processed speedily without a delay in the change of display even if input conditions are altered.

Moreover, when the main processing routine exclusive of the part for fluctuation-suppressing is so structured that it can be shared with routines for other measurements such as testing of source voltage, it is necessary only to replace the input circuit such as the A-D conversion circuit or the output circuit such as the decoder or the displayer if the fluctuation-suppressing process is invalidated by closing the switch 23. This measuring device can thus be used with a large variety of instruments.

The switch 23 may be external piece already forming a grounded path. Alternatively, it may be so structured to make it difficult to operate it from outside, for example, by using a conductive tool such as a screw driver to short-circuit a nearby conductive route formed on a printed board. In short, it is sufficient if the selection control means for invalidating the fluctuation-suppressing function incorporated in the main processing function can be adjusted from outside.

If there are internally contained processing functions which can also be used with other instruments, a jumper, for example, may be used already in the production stage to short-circuit the switch 23. Thus, the element can be used effectively without requiring any difficult operations.

Although only a few preferred embodiments have been disclosed above, it is to be understood that many changes can be made thereon without departing from the scope of this invention and that all matter contained in the above description or shown in the accompanying drawings should be interpreted as illustrative rather than as limiting.

We claim:
1. A measuring device comprising
    a sensor means for entering an electrical signal which varies according to a measured quantity,
    a processing circuit for outputting a warning signal or displaying a result of measurement at a display means according to the value of said electrical signal,
    a fluctuation suppressing means having fluctuation suppressing function for absorbing fluctuations in detected signals caused by irregular variations in said measured quantity and suppressing display of irregular variations at said display means,
    a switching means external to said processing circuit, for outputting an open/close signal, and
    a selection controlling means within said processing circuit for controlling validity and invalidity of said fluctuation suppressing function of said fluctuation suppressing means according to said open/close signal from said switching means.
2. The device of claim 1 wherein said sensor means includes a rheostat unit and an A-D conversion circuit.
3. The device of claim 1 wherein said processing circuit and said fluctuation suppressing means are an microcomputer.
4. The device of claim 1 wherein said fluctuation-suppressing means is a delay circuit which temporally delays the transmission of said detected signal.

* * * * *